United States Patent Office 3,328,349
Patented June 27, 1967

3,328,349
FLUORINATED SILOXANE COPOLYMERS
Charles W. Lentz, Midland, Mich., assignor to Dow Corning Corporation, Midland, Mich., a corporation of Michigan
No Drawing. Filed Apr. 15, 1965, Ser. No. 448,248
8 Claims. (Cl. 260—46.5)

This invention relates to a benzene soluble siloxane copolymer consisting essentially of fluorine containing triorganosiloxane units and $SiO_2$ units.

It is an object of this invention to provide benzene soluble siloxane copolymers containing fluorinated organic radicals in which a substantial portion of the copolymer is $SiO_2$ units. Another object is to prepare a siloxane copolymer which when cured is solvent resistant. Another object is to provide a siloxane copolymer which does not show a modulus increase in cured silicone rubber compositions during storage or use. Other objects and advantages will become apparent from the following detailed description.

This invention relates to a benzene soluble siloxane copolymer consisting essentially of (1) siloxane units of the formula $(C_nF_{2n+1}CH_2CH_2)(CH_3)_2SiO_{0.5}$ in which $n$ has a value from 1 to 10 and (2) $SiO_2$ units, there being an average of from 0.3 to 1.0 units of (1) per unit of (2) in the copolymer.

The siloxane units in (1) are of the formula $(C_nF_{2n+1}CH_2CH_2)(CH_3)_2SiO_{0.5}$. Examples of the siloxane units of (1) are $(CF_3CH_2CH_2)(CH_3)_2SiO_{0.5}$
$(CF_3CF_2CH_2CH_2)(CH_3)_2SiO_{0.5}$
$[CF_3(CF_2)_2CH_2CH_2](CH_3)_2SiO_{0.5}$
$[CF_3(CF_2)_3CH_2CH_2](CH_3)_2SiO_{0.5}$
$[(CF_3)_2CFCH_2CH_2](CH_3)_2SiO_{0.5}$
$[CF_3(CF_2)_9CH_2CH_2](CH_3)_2SiO_{0.5}$
$[CF_3(CF_2)_2CF(CF_3)CH_2CH_2](CH_3)_2SiO_{0.5}$ and $[CH_3CF_2CF(CF_3)CH_2CH_2](CH_3)_2SiO_{0.5}$ Preferably $n$ has a value of 1 to 4 and the most preferred unit is $(CF_3CH_2CH_2)(CH_3)_2SiO_{0.5}$. Other siloxane units (3) which can be present in small amounts, up to 20 mol percent are $(CH_2=CH)(CH_3)_2SiO_{0.5}$ and $(CH_3)_2HSiO_{0.5}$ preferably these units do not exceed 10 mol percent of the copolymer. When present, these units are present in amounts from 1 to 20 mol percent, based on the total number of mols of (1), (2) and (3). These siloxane units provide radicals such as vinyl and hydrogen which are useful in cross-linking some siloxane systems, such as siloxane rubber.

The siloxane units of (1) are present in amounts such that there is from 0.3 to 1.0 siloxane units of (1) per unit of $SiO_2$. Preferably there is from 0.6 to 1.0 siloxane units of (1) per unit of $SiO_2$. When the amount of siloxane units (1) is less than 0.3 units per $SiO_2$, the siloxane copolymers are not soluble in benzene.

The fluorinated siloxane copolymers of this invention can be prepared by the method described in U.S. Patent No. 2,676,182. Briefly, the method is mixing sodium silicate with a mixture of concentrated hydrochloric acid and an alcohol such as ethanol or propanol and then $[(C_nF_{2n+1}CH_2CH_2)(CH_3)_2Si]_2O$ and/or $(C_nF_{2n+1}CH_2CH_2)(CH_3)_2SiCl$ is added slowly. The mixture is heated at about 40° to 100° C. for a period of time such as 1 to 5 hours. The product is then separated from the solvent and washed free from acid. Any excess disiloxane can be removed by distillation at reduced pressure.

The fluorinated siloxane copolymers are useful for water-proofing applications, for adding strength to silicone rubbers and as thickening agents. The fluorinated siloxane copolymers of this invention are particularly useful in making solvent resistant pressure sensitive adhesives, in making solvent resistant silicone rubbers and in defoaming applications. The fluorinated siloxane copolymers of this invention are particularly useful in preparing silicone rubbers in which the modulus will not increase during storage or use after the silicone rubber has been cured. The fluorinated siloxane copolymers of this invention which contain vinyl radicals and silicon-bonded hydrogen atoms are useful as cross-linking agents which provide solvent resistance and constant modulus properties to silicone rubbers.

The following examples are illustrative only of this invention and should not be construed as limiting the scope thereof, which is properly delineated in the appended claims.

Example 1

A fluorinated siloxane copolymer was prepared as follows: 132 ml. of concentrated hydrochloric acid was admixed with 99 ml. of isopropanol and the mixture was cooled to 20° C. A mixture of 144 ml. of sodium silicate (52 g. of $SiO_2$) and 297 ml. of water was added with stirring to the acid mixture over a 20 minute period at 20° to 22° C. After the addition was complete a mixture of 249 ml. of

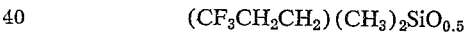

and 84 ml. of isopropanol was added over a 20 minute period at 20° to 22° C. 159 ml. of 3,3,3-trifluoropropyldimethylchlorosilane was then added over a 10 minute period. The mixture was then stirred and heated at 50° to 55° C. for 2.75 hours. The product layer was separated and washed free of acid with water. The excess disiloxane was removed by strip distillation. The product was then heated for 2.5 hours on a steam bath at reduced pressure. The product had a ratio of about 0.6

$(CF_3CH_2CH_2)(CH_3)_2SiO_{0.5}$ per $SiO_2$ and was soluble in benzene.

Example 2

The method of Example 1 was repeated except that 318 ml. of 3,3,3 - trifluoropropyldimethylchlorosilane was added. The product obtained had a ratio of about 0.7 $(CF_3CH_2CH_2)(CH_3)_2SiO_{0.5}$ units per $SiO_2$ and was benzene soluble. The resin in xylene was azeotroped dry and the final dry solution was 65 weight percent fluorinated siloxane copolymer. 20 weight percent based on the weight of the copolymer of vinyldimethylchlorosilane was added when the temperature from the azeotroping had dropped to 70° C. The mixture was then heated to reflux and held at reflux temperature for 10 hours. The temperature was then increased from 128° C. to 142° C. by removing 10 weight percent of the xylene. The mixture was then cooled and 1.5 weight percent water and 30 weight percent xylene based on the mixture weight was added. This mixture was stirred for 0.75 hour and then 20 weight percent of the xylene was removed. The product was cooled, neutralized with sodium bicarbonate and filtered. The xylene soluble fluorinated siloxane copolymer increased the strength of silicone rubber when used in a fluorinated silicone rubber or dimethylsiloxane silicone rubber.

Example 3

The method of Example 2 was used except that 100 ml. of dimethylhydrogenchlorosilane was added in addition to the other ingredients. The product was used to make a silicone rubber stock which cures at room temperature. The cured silicone rubber did not increase in modulus over an extended period of time. An equivalent silicone rubber stock was cured except that the siloxane copolymer used consisted of $(CH_3)_3SiO_{0.5}$ units and $SiO_2$ units, when stored the modulus gradually increased.

*Example 4*

When the following silanes are substituted in the procedure of Example 1 and the amount of the silane added is adequate to provide the triorganosiloxane to $SiO_2$ ratio as indicated, equivalent benzene soluble fluorinated siloxane copolymers are obtained.

| Silane | Product | Ratio |
|---|---|---|
| $(CF_3CF_2CH_2CH_2)(CH_3)_2SiCl$ | $(CF_3CH_2CH_2)(CH_3)_2SiO_{0.5}/SiO_2$ | 0.3/1 |
| $[CF_3(CF_2)_3CH_2CH_2](CH_3)_2SiCl$ | $[CF_3(CF_2)_3CH_2CH_2](CH_3)_2SiO_{0.5}/SiO_2$ | 1.0/1 |
| $[(CF_3)_2CFCH_2CH_2](CH_3)_2SiCl$ | $[(CF_3)_2CFCH_2CH_2](CH_3)_2SiO_{0.5}/SiO_2$ | 0.8/1 |
| $(CF_3CH_2CH_2)(CH_3)_2SiCl$ | $(CF_3CH_2CH_2)(CH_3)_2SiO_{0.5}/SiO_2$ | 0.4/1 |
| $[CF_3(CF_2)_9CH_2CH_2](CH_3)_2SiCl$ | $[CF_3(CF_2)_9CH_2CH_2](CH_3)_2SiO_{0.5}/SiO_2$ | 0.7/1 |

That which is claimed is:

1. A benzene soluble siloxane copolymer consisting essentially of
   (1) siloxane units of the formula
   $$(C_nF_{2n+1}CH_2CH_2)(CH_3)_2SiO_{0.5}$$
   in which $n$ has a value from 1 to 10 and
   (2) $SiO_2$ units, and there being an average of from 0.3 to 1.0 unit of (1) per unit of (2).

2. The benzene soluble siloxane copolymer of claim 1 in which the units of (1) are present in amounts from 0.6 to 1.0 per unit of $SiO_2$.

3. A benzene soluble siloxane copolymer consisting essentially of
   (1) $(CF_3CH_2CH_2)(CH_3)_2SiO_{0.5}$ units and
   (2) $SiO_2$ units, and there being an average of from 0.3 to 1.0 unit of (1) per unit of (2).

4. A benzene soluble siloxane copolymer consisting essentially of
   (1) siloxane units of the formula
   $$(C_nF_{2n+1}CH_2CH_2)(CH_3)_2SiO_{0.5}$$
   in which $n$ has a value of from 1 to 10,
   (2) $SiO_2$ units, and
   (3) siloxane units selected from the group consisting of $(CH_2=CH)(CH_3)_2SiO_{0.5}$, $(CH_3)_2HSiO_{0.5}$ and mixtures thereof, and there being an average of from 0.3 to 1.0 unit of (1) per unit of (2) and there being from 1 to 20 mol percent of units (3) based on the total number of moles in (1), (2) and (3).

5. The benzene soluble siloxane copolymer of claim 4 in which the siloxane units (3) are
$$(CH_2=CH)(CH_3)_2SiO_{0.5}.$$

6. The benzene soluble siloxane copolymer of claim 5 in which the siloxane units (3) are present in amounts from 5 to 10 mol percent.

7. The benzene soluble siloxane copolymer of claim 4 in which the siloxane units (3) are $(CH_3)_2HSiO_{0.5}$.

8. The benzene soluble siloxane copolymer of claim 4 in which the siloxane units of (3) are
$$(CT_2=CH)(CH_3)_2SiO_{0.5} \text{ and } (CH_3)_2HSiO_{0.5}$$

References Cited

UNITED STATES PATENTS

| | | | |
|---|---|---|---|
| 2,676,182 | 4/1954 | Dandt et al. | 260—46.5 |
| 2,961,425 | 11/1960 | Pierce et al. | 260—46.5 |
| 3,015,645 | 1/1962 | Tyler | 260—46.5 |
| 3,024,210 | 3/1962 | Weyer | 260—46.5 |
| 3,122,520 | 5/1964 | Lentz | 260—46.5 |

DONALD E. CJAJA, *Primary Examiner.*

LEON J. BERCOVITZ, *Examiner.*

M. I. MARQUIS, *Assistant Examiner.*

U.S. PATENT OFFICE
UNITED STATES PATENT OFFICE
CERTIFICATE OF CORRECTION

Patent No. 3,328,349                    Dated: June 27, 1967

CHARLES W. LENTZ

It is certified that errors appear in the above identified patent and that said Letters Patent are hereby corrected as shown below:

Col. 1, line 40 - the formula beginning "[$CH_3CF_2CF$(" should begin "[$CF_3CF_2CF$(".

Col. 4, line 27 - the formula beginning "($CT_2=CH$)" should begin "($CH_2=CH$)"

Signed and sealed this 29th day of February 1972.

(SEAL)
Attest:

EDWARD M.FLETCHER,JR.              ROBERT GOTTSCHALK
Attesting Officer                   Commissioner of Patents